United States Patent
Gernone et al.

(10) Patent No.: US 12,529,338 B1
(45) Date of Patent: Jan. 20, 2026

(54) HEAT SOURCE FOR HYDROGEN FUEL SUPPLY SYSTEM

(71) Applicants: General Electric Company, Evendale, OH (US); GE Avio S.r.l., Rivalta di Torino (IT)

(72) Inventors: Mirko Gernone, Noicattaro (IT); James L. Haffner, Cincinnati, OH (US); David Justin Brady, Rockport, MA (US)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 18/981,043

(22) Filed: Dec. 13, 2024

(51) Int. Cl.
*F02C 7/224* (2006.01)
*F02C 3/22* (2006.01)
*F02C 7/232* (2006.01)
*F02C 9/26* (2006.01)
*F02C 9/28* (2006.01)

(52) U.S. Cl.
CPC ............... *F02C 7/224* (2013.01); *F02C 3/22* (2013.01); *F02C 7/232* (2013.01); *F02C 9/263* (2013.01); *F02C 9/28* (2013.01)

(58) Field of Classification Search
CPC .. F02C 7/22; F02C 7/222; F02C 7/224; F02C 7/232; F02C 3/20; F02C 3/22; F02C 9/26; F02C 9/263; F02C 9/28; F02C 9/40
See application file for complete search history.

(56) References Cited

U.S. PATENT DOCUMENTS

| | | | | |
|---|---|---|---|---|
| 5,363,641 | A * | 11/1994 | Dixon | F02C 6/08 60/788 |
| 6,079,222 | A * | 6/2000 | Fetescu | F17C 9/04 62/915 |
| 10,989,117 | B2 * | 4/2021 | Roberge | F02C 3/22 |
| 11,041,439 | B2 * | 6/2021 | Roberge | F02C 7/224 |
| 11,668,243 | B2 | 6/2023 | Muldoon et al. | |
| 11,674,443 | B2 | 6/2023 | McCurdy Gibson et al. | |
| 11,692,479 | B2 | 7/2023 | Rambo et al. | |
| 11,808,204 | B2 | 11/2023 | Lambert et al. | |
| 11,988,147 | B2 | 5/2024 | Owoeye et al. | |
| 2020/0088102 | A1 * | 3/2020 | Roberge | F02C 7/224 |
| 2021/0207537 | A1 * | 7/2021 | Roberge | F04B 9/02 |
| 2021/0340908 | A1 * | 11/2021 | Boucher | F02C 7/224 |
| 2021/0348561 | A1 * | 11/2021 | Cocks | F02C 7/12 |
| 2022/0297844 | A1 * | 9/2022 | Mackin | B64C 35/023 |
| 2023/0358180 | A1 * | 11/2023 | Brady | F02C 3/22 |
| 2024/0010350 | A1 * | 1/2024 | Terwilliger | B64D 27/34 |
| 2024/0052782 | A1 | 2/2024 | Muldoon et al. | |
| 2024/0113594 | A1 | 4/2024 | Earl et al. | |
| 2024/0151358 | A1 | 5/2024 | Minas et al. | |
| 2024/0360786 | A1 * | 10/2024 | Evans | F02C 7/224 |

* cited by examiner

*Primary Examiner* — William H Rodriguez
(74) *Attorney, Agent, or Firm* — Hanley, Flight & Zimmerman, LLC

(57) ABSTRACT

Methods and apparatus are disclosed for a heat source for a hydrogen fuel supply system of a turbine engine. An example apparatus includes a heat source configured to burn gaseous hydrogen to produce heat energy and a byproduct of combustion, a pipeline to transport gaseous hydrogen from a hydrogen supply to the heat source, a vent coupled to the heat source to vent excess gaseous hydrogen and the byproduct of combustion, and a heat exchanger coupled to the heat source to use the heat energy of the heat source to heat liquid hydrogen in the pipeline.

19 Claims, 6 Drawing Sheets

HEAT SOURCE FOR HYDROGEN FUEL SUPPLY SYSTEM

TECHNICAL FIELD

This disclosure relates generally to a combustor for a fuel supply system and, more particularly, to a heat source for a hydrogen fuel supply system of a turbine engine.

BACKGROUND

A gas turbine engine is driven by combustion of a combustible fuel within a combustor of the engine. For a hydrogen-powered gas turbine, the process of starting and running the engine introduces unique requirements due to hydrogen's physical and chemical properties. Hydrogen fuel in gas turbine engines is typically stored in its liquid form at extremely low temperatures to maintain its density and ensure efficient storage. Upon engine startup, liquid hydrogen is converted into a gaseous state for efficient mixing with air and combustion. A starting heater is used to heat liquid hydrogen to reach its gaseous state and mix effectively with air for combustion.

BRIEF DESCRIPTION OF THE DRAWINGS

A full and enabling disclosure, including the best mode thereof, directed to one of ordinary skill in the art, is set forth in the specification, which makes reference to the appended figures in which.

Figure 1:
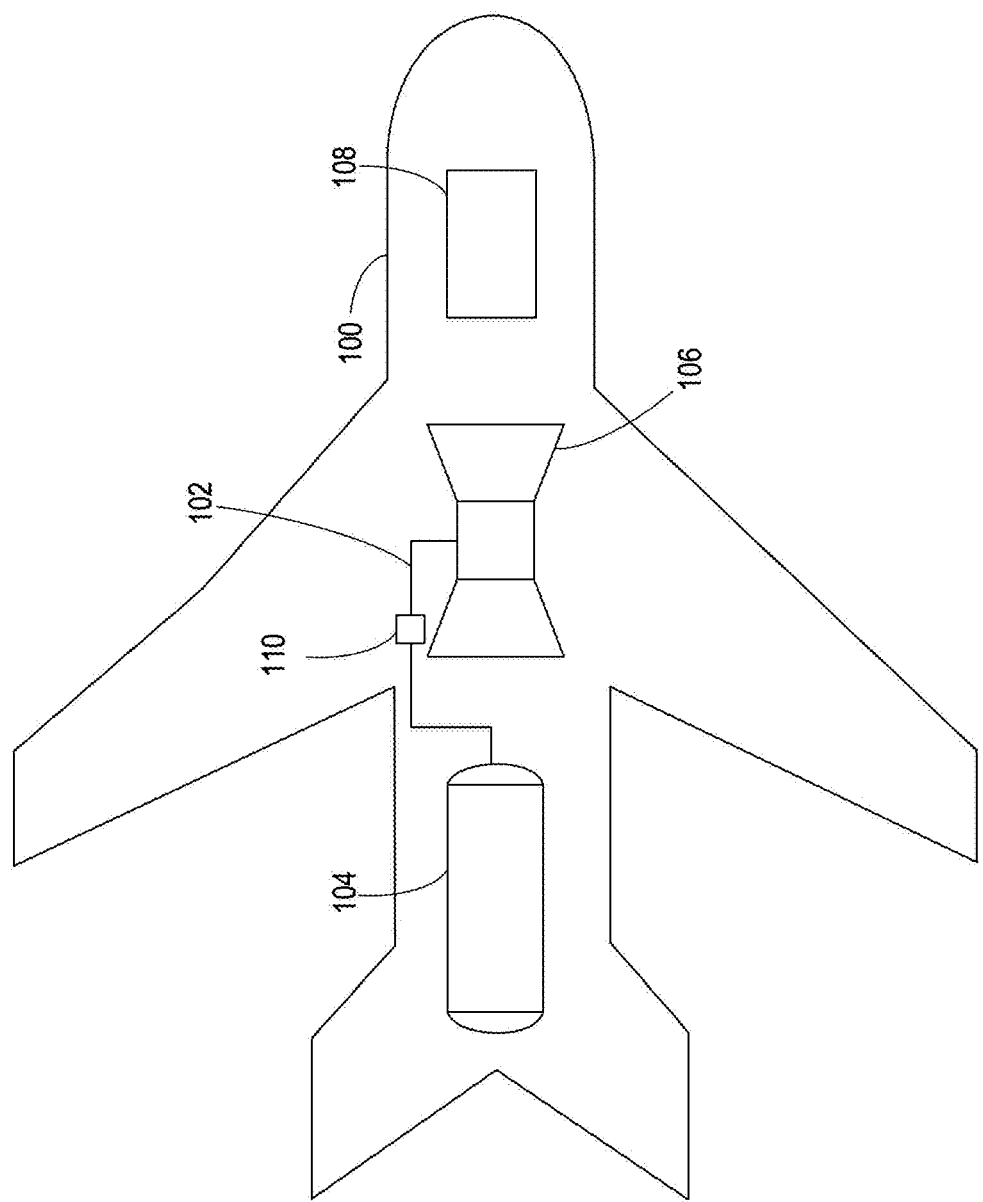
FIG. 1 is a simplified illustration including a hydrogen fuel distribution system in which the teachings of this disclosure can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

In a gas turbine engine, power is generated through the combustion of a fuel within the engine's combustor. For a hydrogen-powered gas turbine, the process of starting and running the engine introduces unique requirements due to hydrogen's physical and chemical properties. Hydrogen when used as a fuel in gas turbine engines is typically stored in its liquid form because of its low density. However, liquid hydrogen (LH2) needs to be heated to reach its gaseous hydrogen (GH2) state before being vented to atmosphere or burned in the engine combustor. During an engine start, before the engine produces enough heat to supply energy, a starting heater is used to heat the liquid hydrogen. The starting heater is used to heat the liquid hydrogen to ensure it vaporizes and reaches the proper temperature and pressure for optimal combustion. The starting heater utilizes electrical or other heat sources to warm the liquid hydrogen as it passes through. This ensures that the hydrogen is in the gaseous phase or state, and at the appropriate temperature to mix with air in the combustor. Once it is heated, the hydrogen enters the combustor, where it is mixed with air and ignited by a spark or other ignition source. Additionally, a vent heater is used to heat the LH2 or GH2 in the venting system to ensure any vented H2 meets temperature regulations.

Methods and apparatus disclosed herein incorporate an auxiliary combustor in the hydrogen fuel supply system of a gas turbine engine to be used to heat liquid hydrogen to change phase to a gaseous hydrogen state during engine start operation. The auxiliary combustor removes the need for the starting heater and the vent heater which are normally electric heaters. This reduces the weight of the overall system, as electrical heaters are heavy. The auxiliary combustor also removes the requirement of a significant source of electricity that is typically required for the electric heaters.

For purposes of illustration, the present disclosure will be described with respect to the combustor for an aircraft turbine engine. It will be understood, however, that aspects of the disclosure described herein are not so limited and may have general applicability within an engine, including compressors, power generation turbines, as well as in non-aircraft applications, such as other mobile applications and non-mobile industrial, commercial, and residential applications.

Reference will now be made in detail to the auxiliary combustor architecture located within a turbine engine, one or more examples of which are illustrated in the accompanying drawings. The detailed description uses numerical and letter designations to refer to features in the drawings. Like or similar designations in the drawings and description have been used to refer to like or similar parts of the disclosure.

Unless specifically stated otherwise, as used herein, the terms "first", "second", and "third" may be used interchangeably to distinguish one component from another and are not intended to signify location or importance of the individual components. In some examples, the descriptor "first" may be used to refer to a component in the detailed description, while the same component may be referred to in a claim with a different descriptor such as "second" or "third." In such instances, it should be understood that such descriptors are used merely for identifying those components distinctly within the context of the discussion (e.g., within a claim) in which the components might, for example, otherwise share a same name. The terms "forward" and "aft" refer to relative positions within a turbine engine or vehicle and refer to the normal operational attitude of the turbine engine or vehicle. For example, with regard to a turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

The singular forms "a", "an", and "the" include plural references unless the context clearly dictates otherwise. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc-Read Only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

FIG. 1 is an example illustration of an aircraft 100 including an example fuel distribution system 102. The fuel distribution system 102 includes an example tank 104 of hydrogen, which provides fuel to an example gas turbine engine 106. An example fuel conditioning system 110 is part of the fuel distribution system 102. The fuel conditioning system 110 warms the liquid hydrogen so the liquid hydrogen can transition into a gas before entering the gas turbine engine 106, making it easier to combust. Example implementations of the fuel distribution system 102 are described below in conjunction with FIGS. 2 and 3. The example tank 104 can contain hydrogen in various states, including liquid, gaseous, and cryo-compressed states. The example tank 104 can be stored in any suitable location on the aircraft (e.g., in the wings, in the fuselage, in an external tank, etc.). In other examples, the tank 104 can include multiple tanks (herein referred to as a tank bank, etc.).

Although the aircraft 100 shown in FIG. 1 is an airplane, the embodiments described herein may also be applicable to other fixed-wing aircraft, including unmanned aerial vehicles (UAV). The fuel distribution system 102 can be used to provide hydrogen fuel that will be combusted in an example gas turbine engine 106 of the aircraft 100. In the illustrated example of FIG. 1, the aircraft includes a single gas turbine engine (e.g., the gas turbine engine 106, etc.). In some examples, the aircraft 100 can include multiple gas turbine engines.

In FIG. 1, the fuel distribution system 102 is controlled and monitored by example fuel distribution controller circuitry 108. For example, the fuel distribution controller circuitry 108 can regulate the flow of hydrogen through the fuel distribution system 102 via one or more control mechanisms (e.g., valves, etc.) to meet a throttle demand from the aircraft 100. The fuel distribution controller circuitry 108 monitors the health of the fuel distribution system 102. For example, the fuel distribution controller circuitry 108 can determine an outflow of hydrogen from the tank 104 and inflow of hydrogen into the gas turbine engine 106. The fuel distribution controller circuitry 108 can compare the inflow of hydrogen into the fuel distribution system 102 to the outflow of hydrogen out of the fuel distribution system 102 to determine a mass loss rate of the fuel distribution system 102. In some examples, the fuel distribution controller circuitry 108 can compare the determined mass loss rate to one or more thresholds to determine the health of the fuel distribution system 102. In some examples, the fuel distribution controller circuitry 108 can determine that a leak is present in the fuel distribution system 102 and/or the sensors of the fuel distribution system need to be recalibrated. An example implementation of the fuel distribution controller circuitry 108 is described below in conjunction with FIG. 4.

The embodiments of the fuel tank(s) described herein may also be applicable to other applications where hydrogen is used as a fuel in the aircraft 100. The embodiments described herein also may be applicable to engine(s) other than gas turbine engines. While the gas turbine engine 106 is an example of a power generator for powering the aircraft 100 using hydrogen as a fuel, hydrogen may also be used as a fuel for other power generators. For example, a power generator may be a fuel cell (e.g., hydrogen fuel cell, etc.) where the hydrogen is provided to the fuel cell to generate electricity by reacting with air.

Figure 2:
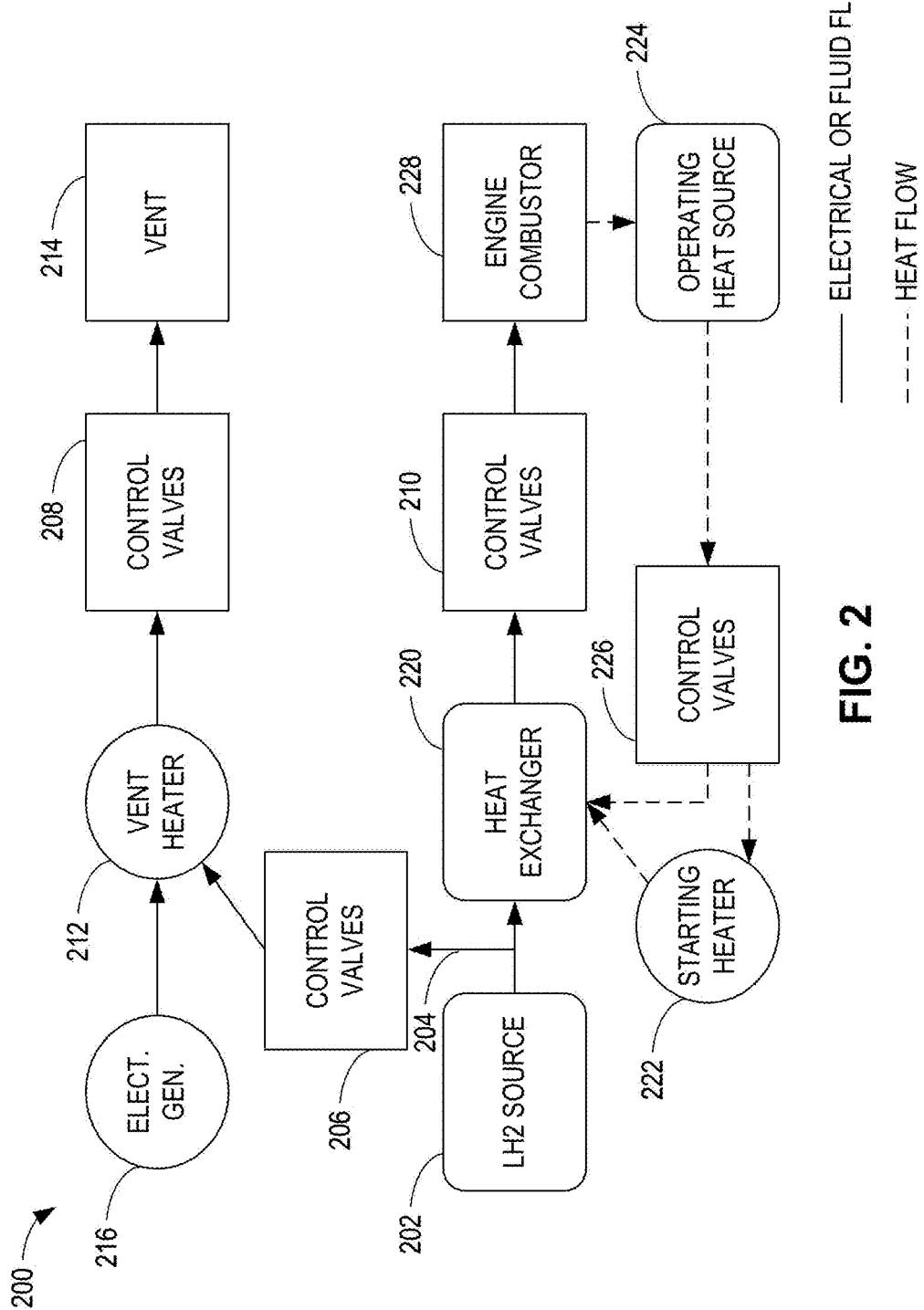
FIG. 2 schematically illustrates a hydrogen fuel system for engine combustor start-up using liquid hydrogen fuel supply in the gas turbine engine of FIG. 1.

FIG. 2 schematically illustrates an example hydrogen fuel system 200 for combustor start-up using liquid hydrogen fuel supply in a hydrogen fuel system turbine engine. The hydrogen fuel system 200 for combustor start-up includes a LH2 source 202 for maintaining the hydrogen fuel in a liquid phase. For example, the LH2 source 202 may be configured to store the hydrogen fuel at a temperature of about −253° C. or less, and at a pressure greater than about one bar and less than about 10 bar, such as between about three bar and about five bar, or at other temperatures and pressures to maintain the hydrogen fuel substantially in the liquid phase. In the example of FIG. 2, the combustor start-up components are coupled by a flow path 204. In some examples, the flow path 204 includes a low pressure pump, high pressure pump and pipes. Flow control valve(s) 206, and 208 can be used to regulate the flow of LH2 from the LH2 source 202. The flow control valve(s) 206, and 208 can be constructed to thermally insulate the cryogenic fuel during transmission so that the fluid does not heat up, vaporize, and/or leak out as a gas. Initially, components in the hydrogen flow path 204 are too warm for LH2 to remain in a liquid state. When LH2 is introduced, LH2 can vaporize into GH2 due to the higher temperature. To manage the vaporized hydrogen, a vent 214 is used to expel the unwanted GH2, preventing pressure build up and ensuring safety during this phase. In the example of FIG. 2, the flow control valve 206 is connected to the LH2 source 202 by the flow path 204. A flow control valve 210 can be used to regulate the flow of GH2 downstream of a heat exchanger 220.

The combustor start-up components also include a vent heater 212 and the vent 214 located downstream of the vent heater 212. The example vent heater 212 operates in the fuel conditioning system 110 for a gas turbine engine such as that shown in FIG. 1. In some examples, the vent heater 212 is an electric heater. The vent heater 212 can be configured to generate heat using energy from an electric generator 216 coupled to the vent heater 212. The vent heater 212 is used to maintain a controlled temperature, ensuring that LH2 does not exit through the vent 214. This vent system helps maintain the desired conditions for the LH2 to remain in liquid form and prevents venting of the cryogenic fuel. The vent heater 212 is used to control the phase and temperature of the GH2 expelled through the vent 214.

The heat exchanger 220 is coupled to the LH2 source 202 and is configured to convert the hydrogen fuel from the liquid phase to a gaseous phase. For example, the heat exchanger 220 may be in thermal communication with a starting heater 222, and an operating heat source 224 of the engine through a control valve 226 to provide the heat to increase a temperature of the hydrogen fuel to change the hydrogen fuel from the liquid phase to the gaseous phase and heat the GH2 to a temperature acceptable to an engine combustor. The converted hydrogen fuel is then routed to an example engine combustor 228. The engine combustor 228 is the same component as engine combustor 118 in FIG. 1. A desired amount of fuel is provided to the engine combustor 228 using the flow control valve 210.

In some examples, the starting heater 222 is an electric heater used to heat the liquid hydrogen during the engine start operation. When starting heater 222 is an electric heater, it will use electrical energy supplied from a source such as electric generator 216 to produce heat. The operating heat source 224 of the engine is an example heat source used to increase the temperature of the hydrogen fuel from the LH2 source 202 once the engine combustor 228 is started.

Figure 3:
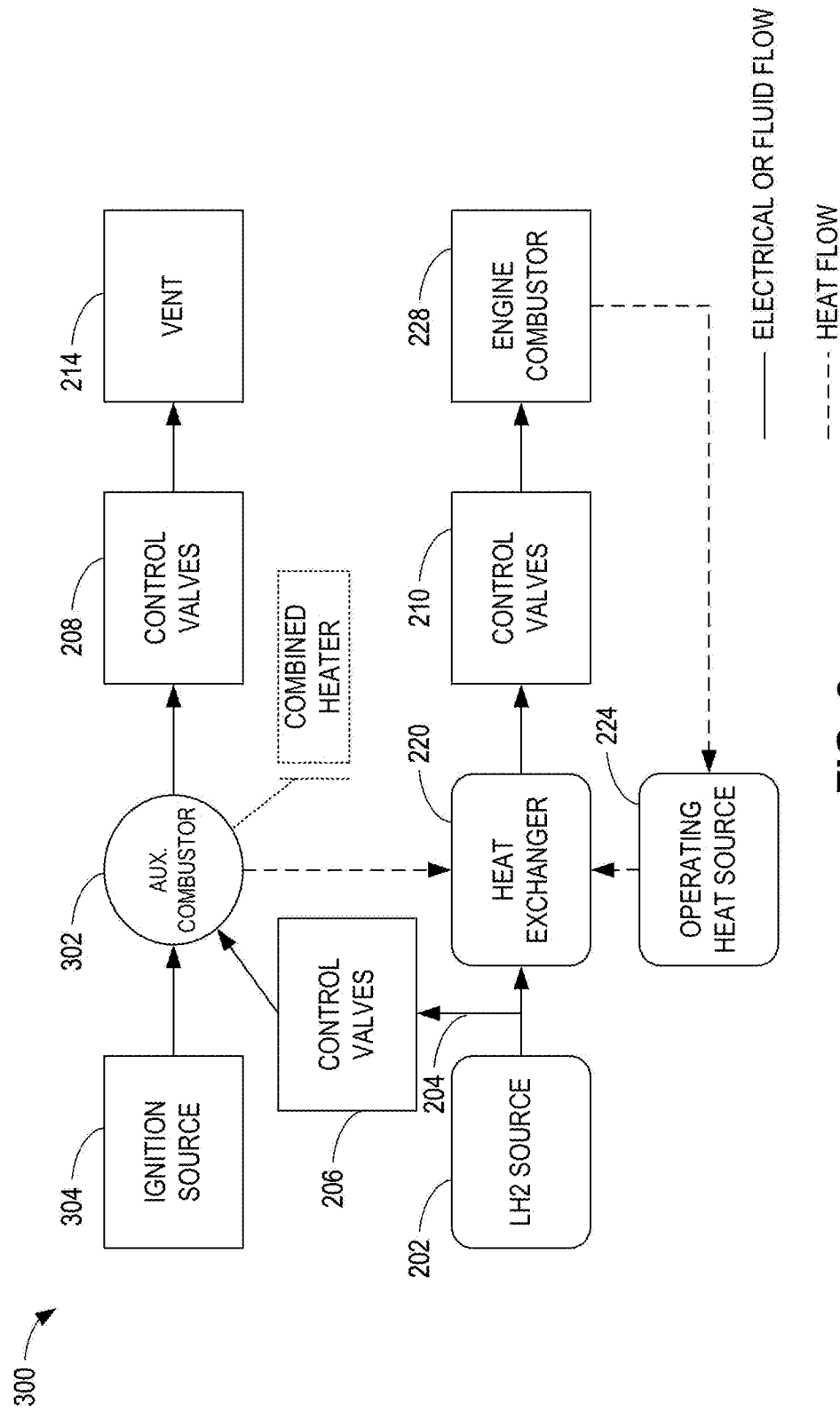
FIG. 3 schematically illustrates an example system in which an example auxiliary combustor operates in a hydrogen fuel supply system of the gas turbine engine of FIG. 1.

FIG. 3 schematically illustrates an example hydrogen fuel system 300 in which an example auxiliary combustor 302 operates in the fuel conditioning system 110 for a gas turbine engine such as that shown in FIG. 1. Many of the structures of FIG. 3 are the same or similar to those present in FIG. 2. In the interest of brevity, those structures will not be re-described here. Instead, the interested reader is referred to the above description of FIG. 2 for a full and complete description of those structures. To facilitate that process, like reference numbers are used for like structures in FIG. 3. In the illustrated example of FIG. 3, the LH2 source 202 is fluidly coupled to an example auxiliary combustor 302 instead of the vent heater 212 (FIG. 2). The flow path 204 connects the LH2 source 202 to the auxiliary combustor 302. The flow path 204 transports GH2 or LH2 from the hydrogen supply (e.g., LH2 source 202) to the auxiliary combustor 302 during chill-down of the hydrogen supply. The example auxiliary combustor 302 is additionally coupled to an ignition source 304 to ignite or burn the GH2 generated during chill-down of LH2. Heat from this burning process is also used to change the phase of any LH2 that reaches auxiliary combustor 302.

During the initial chill-down phase of the LH2 system, the hydrogen fuel system will have some amount of GH2 to vent when the initial heat in the system boils the incoming LH2. During the chill-down process, the system components (e.g., tanks, flowlines, and valves) lose heat into the LH2 and start cooling down. The boil-off hydrogen turns into GH2, which is usually vented. Instead, however, the auxiliary combustor 302 of the example of FIG. 3 burns the GH2 that the hydrogen fuel system would otherwise vent. The auxiliary combustor 302 produces a byproduct of combustion which is vented through the vent 214 fluidly coupled to the auxiliary combustor 302. In some examples, the byproduct of combustion is water. The heat generated by the auxiliary combustor 302 is used to heat any LH2 heading toward the vent 214 before the LH2 reaches the vent 214.

The auxiliary combustor 302 is thermally coupled to the heat exchanger 220. The heat exchanger 220 uses the heat energy from the auxiliary combustor 302 to heat LH2 in the pipeline from the hydrogen source (also referred to as a hydrogen supply) 202 to the engine combustor 228. The LH2 is heated in the pipeline without the need for the starting heater 222 during an engine start operation.

The auxiliary combustor 302 is configured as a combined heater used to heat the GH2 in the venting system and as a starting heater to heat LH2 during the engine start operation. The auxiliary combustor 302 replaces the two electric heaters in the hydrogen fuel system 200 (e.g., the vent heater 212 and the starting heater 222) and is configured as a combined heater to perform the function of both the vent heater 212 and starting heater 222. In the disclosed example, the unwanted GH2 that is typically vented is instead directed to the auxiliary combustor 302. The auxiliary combustor ignites the GH2, converting it into thermal energy. This process not only prevents gas waste but also generates additional energy from the GH2 that can assist in starting the engine.

Figure 4:
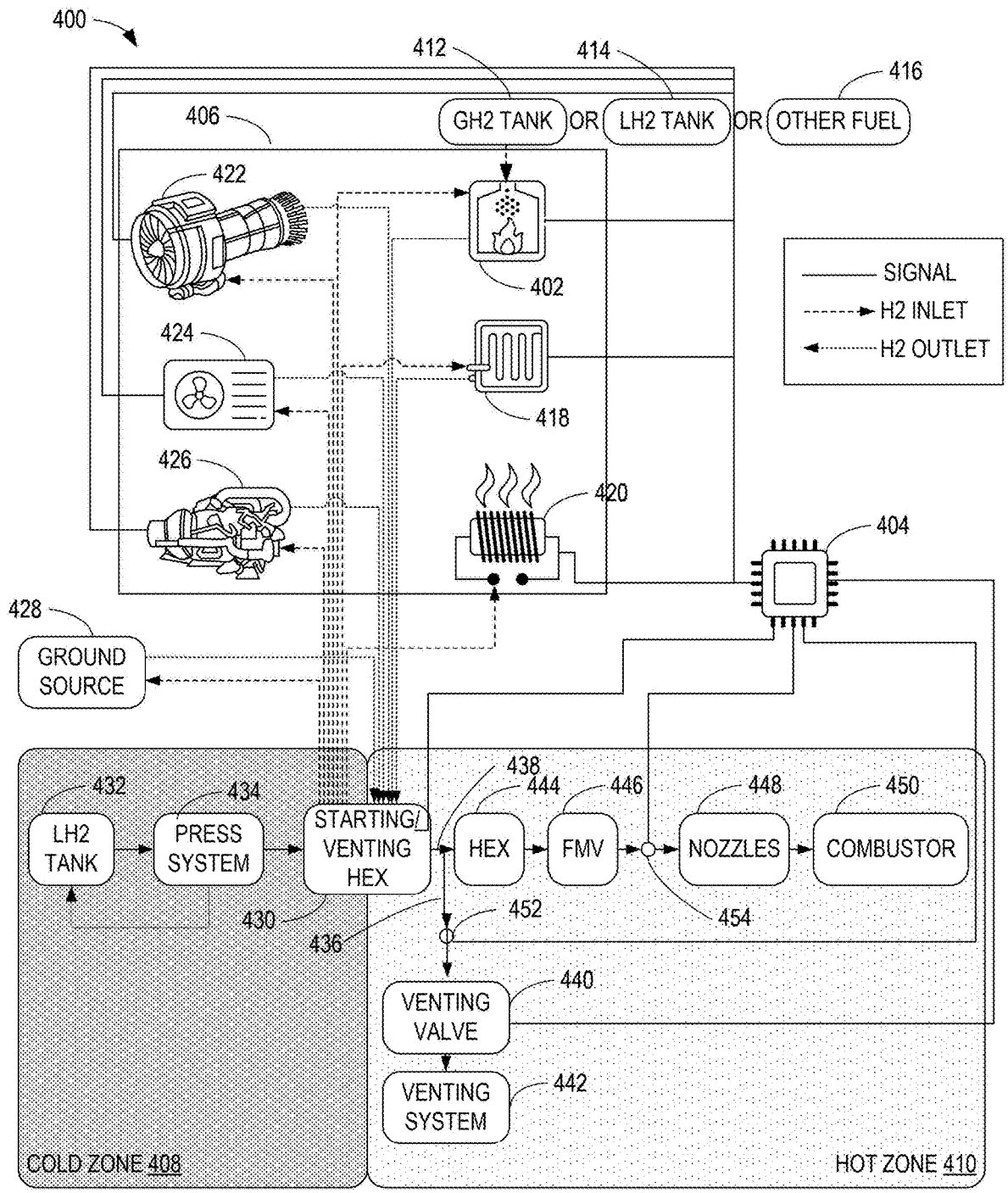
FIG. 4 schematically illustrates an example system in which the example auxiliary combustor or alternate heat source operates in the hydrogen fuel supply system of the gas turbine engine of FIG. 1.

FIG. 4 schematically illustrates an example hydrogen fuel system 400 in which an example auxiliary combustor 402 operates to heat hydrogen fuel during an engine start operation. In the example of FIG. 4, a controller 404 coordinates the ingress of thermal load and the ingress of hydrogen fuel in the hydrogen fuel system 400. The hydrogen fuel system 400 includes a heat source 406, a cold zone 408 and a hot zone 410.

The heat source 406 is configured to provide heat when an engine combustor 450 is off. The engine combustor 450 is the same component as the engine combustor 118 in FIG. 1. In some examples, the heat source 406 includes the auxiliary combustor 402 fueled by a GH2 412, a LH2 414 or another available fuel source 416. In some examples, the heat loss from the production of electrical power from a fuel cell 418 functions as the heat source when engine is off. In some examples an electric heater 420 is used as an available heat source. In a twin engine application with a second engine 422, the second engine 422 functions as the heat source when the second engine 422 is running and the engine combustor 450 is off. In some examples, a heat pump 424 powered by an auxiliary power unit (APU) 426, other engine or fuel cell operates as the heat source. Additionally, the APU 426 heat rejected by turbomachinery (e.g., through the APU lube system) can function as heat source during an engine start operation. In some examples, a ground source 428 or other external source is used as the heat source when the engine is off. The heat source 406 is thermally coupled to a starting or venting heat exchanger 430, which is fluidly coupled to a LH2 tank 432 in the cold zone 408.

The cold zone 408 includes the LH2 tank 432 and a pressurization system 434. LH2 is stored at extremely low temperatures (e.g., −253° C. to −240° C. or −423° F. to −400° F.) and can evaporate (e.g., boil-off) if the temperature rises or if there is insufficient pressure. The pressurization system 434 increases the pressure within the tank to keep LH2 in its liquid state, to overcome the pressure losses to flow through the combustor, minimizing or otherwise reducing boil-off and helping to ensure efficient storage. The pressurization system 434 controls the pressure of the LH2 to help ensure a consistent and reliable flow of hydrogen to the engine or fuel cell 418. The pressurization system 434 is coupled to the starting or venting heat exchanger 430. The starting or venting heat exchanger 430 is used to control the temperature and pressure of the hydrogen, to help ensure that the hydrogen stays within the desired parameters.

The starting or venting heat exchanger 430 is fluidly coupled to a first pipeline 436 and a second pipeline 438 in the hot zone 410. The first pipeline 436 includes a venting valve 440 and a venting system 442. The venting valve 440 controls the flow of fluid into the venting system 442. The venting system 442 vents excess GH2 through its vent.

The second pipeline 438 in the hot zone 410 includes a second heat exchanger 444, a fuel metering valve (FMV) 446, a nozzle 448 and an engine combustor 450 located downstream of the second heat exchanger 444. The second heat exchanger 444 is coupled between the hydrogen supply (e.g., LH2 tank 432) and the engine combustor 450. The second heat exchanger 444 conditions the hydrogen fuel to a specific temperature, helping to ensure that the LH2 is heated to the proper temperature to supply hydrogen to the engine combustor 450 for the engine start operation. In some examples, the second heat exchanger 444 serves to heat the hydrogen to the desired temperature for optimal combustion in the engine combustor 450. The FMV 446 regulates the flow and pressure of the hydrogen fuel. The FMV 446 ensures that the correct amount of hydrogen is delivered to the nozzles 448 for combustion. The nozzles 448 distribute the GH2 within the engine combustor 450. The nozzles 448 direct the hydrogen into the engine combustor 450. The engine combustor 450 receives the hydrogen from the nozzles 448. The hydrogen-air mixture is then ignited and burned in the combustor 450. The combustion process generates high-temperature gases that start or drive the engine.

In the illustrated example of FIG. 4, the fluid flow from the LH2 tank 432 to the hot zone 410 can be tracked by one or more sensor(s) for sensing various operability parameters of the hydrogen fuel system 400. For example, the hydrogen fuel system 400 includes a first sensor 452 configured to sense data indicative of a flow of fluid from the LH2 tank 432 to the venting system 442 and a second sensor 454 configured to sense data indicative of a flow of fluid from the LH2 tank 432 to the engine combustor 450.

The first sensor 452 is coupled between the starting or venting heat exchanger 430 and the vent in the venting system 442. In some examples, the data sensed by the first sensor 452 includes a temperature, a pressure, and/or a flow rate of gaseous hydrogen, and/or any other byproduct of combustion. For example, the first sensor 452 can measure a temperature set point of at least one of vented gaseous hydrogen or the byproduct of combustion to be vented by the venting system 442. The venting valve 440 controls the flow of fluid from the LH2 tank 432 to the venting system 442.

The second sensor 454 is coupled between the second heat exchanger 444 and the engine combustor 450. In some examples, the data sensed by the second sensor 454 can be a temperature, a pressure, and/or a flow rate of gaseous hydrogen fuel injected into the combustor 450. For example, the second sensor 454 can measure target temperature of incoming gaseous hydrogen fuel to be injected into the combustor 450.

The example controller 404 is in electrical communication with the first sensor 452 and the second sensor 454. The controller 404 is operatively coupled to the auxiliary combustor 402. When the temperature set point of the fluid to be vented at the first sensor 452 is not satisfied, the controller 404 controls the ingress of heat energy from the auxiliary combustor 402 in order to make the hydrogen phase change effective. When the temperature of the incoming gaseous hydrogen at the second sensor 454 is not at target temperature, the controller 404 coordinates the ingress of thermal load and the ingress of hydrogen to help ensure a proper temperature of the hydrogen fuel is injected into the engine combustor 450. The thermal load includes heat energy used to both change the phase of the LH2 and increase the temperature of the resulting GH2 during engine start operation.

Referring again to FIG. 3, while an example manner of implementing the auxiliary combustor 302 is illustrated in FIG. 3, one or more of the elements, processes, and/or devices illustrated in FIG. 3 may be combined, divided, re-arranged, omitted, eliminated, and/or implemented in any other way. Further, the example auxiliary combustor of FIG. 3, may be implemented by hardware alone or by hardware in combination with software and/or firmware. Thus, for example, the example auxiliary combustor, can be controlled by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example auxiliary combustor of FIG. 3 may include one or more elements, processes, and/or devices in addition to, or instead of, those illustrated in FIG. 3, and/or may include more than one of any or all of the illustrated elements, processes and devices.

Figure 5:
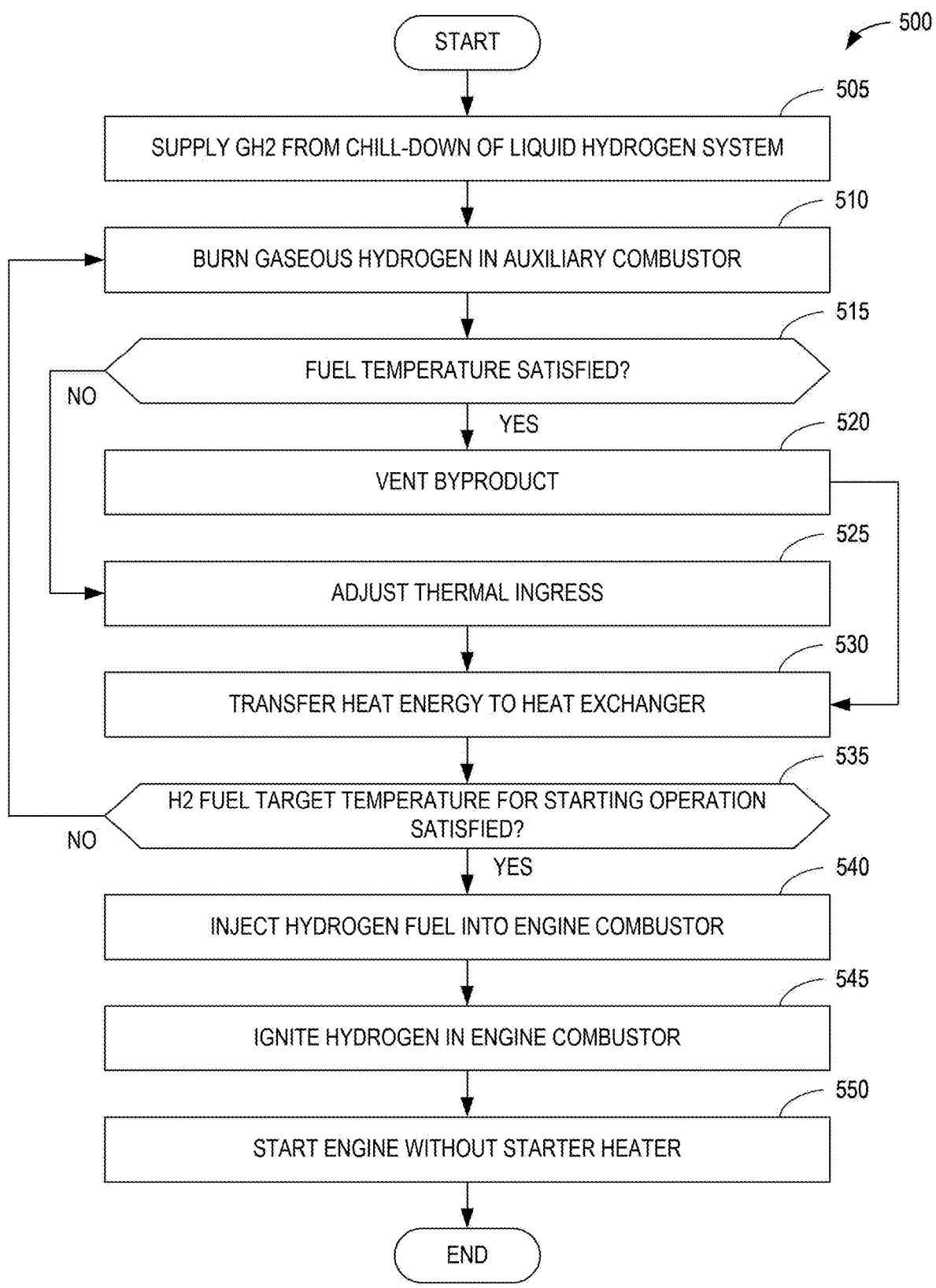
FIG. 5 is a flowchart representative of example machine readable instructions and/or example operations that may be executed, instantiated, and/or performed by example programmable circuitry to implement the auxiliary combustor of FIGS. 3 and 4.

Flowchart(s) representative of example machine readable instructions, which may be executed by programmable circuitry to implement and/or instantiate control of the auxiliary combustor of FIG. 3 and/or representative of example operations which may be performed by programmable circuitry to implement and/or instantiate the control of the auxiliary combustor of FIG. 3, are shown in FIG. 5. The machine readable instructions may be one or more executable programs or portion(s) of one or more executable programs for execution by programmable circuitry such as programmable circuitry 612 shown in the example processor programmable circuitry platform 600 discussed below in connection with FIG. 6.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 5, many other methods of implementing the example auxiliary combustor may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry 612 (FIG. 6) to implement the auxiliary combustion circuitry of FIG. 3 to heat liquid hydrogen to change phase to gaseous hydrogen state when the engine is off. The example machine-readable instructions and/or the example operations 500 of FIG. 5 begin at block 505, at which the liquid hydrogen source 202 (FIG. 3) supplies gaseous hydrogen from chill-down of liquid hydrogen system. As described in connection with FIG. 3, the auxiliary combustor 302 burns the gaseous hydrogen (block 510) to generate heat to heat the liquid hydrogen during engine start operation before the engine is producing enough heat. The first sensor 452 (FIG. 4) measures the fuel temperature set point and determines whether the fuel temperature set point is satisfied (block 515). If the fuel temperature set point is not satisfied (block 515: NO), the controller 404 (FIG. 4) manages the starting or venting heat exchanger 430 (FIG. 4) to adjust the thermal ingress in order to make the hydrogen phase change effective (block 525). If the fuel temperature set point is satisfied (block 515: YES), the vent 214 (FIG. 3) vents the byproduct of combustion (block 520). The heat generated by the burning of the gaseous hydrogen in the auxiliary combustor 302 is transferred to the starting or venting heat exchanger 430 (block 530).

The second sensor 454 (FIG. 4) measures a target temperature of incoming hydrogen to the engine combustor 450 (FIG. 4) and determines whether the target temperature for starting the engine is satisfied (block 535). If the hydrogen fuel target temperature is not satisfied (block 535: NO), control returns to block 510 where the auxiliary combustor 302 burns more gaseous hydrogen to generate more heat energy. If the hydrogen fuel target temperature is satisfied (block 535: YES), the nozzle 448 (FIG. 4) injects hydrogen fuel into the engine combustor 450 (FIG. 4) (block 540). Inside the combustor 450, the hydrogen-air mixture is ignited (block 545). The combustion process generates high temperatures and pressures that start the engine (block 550).

Figure 6:
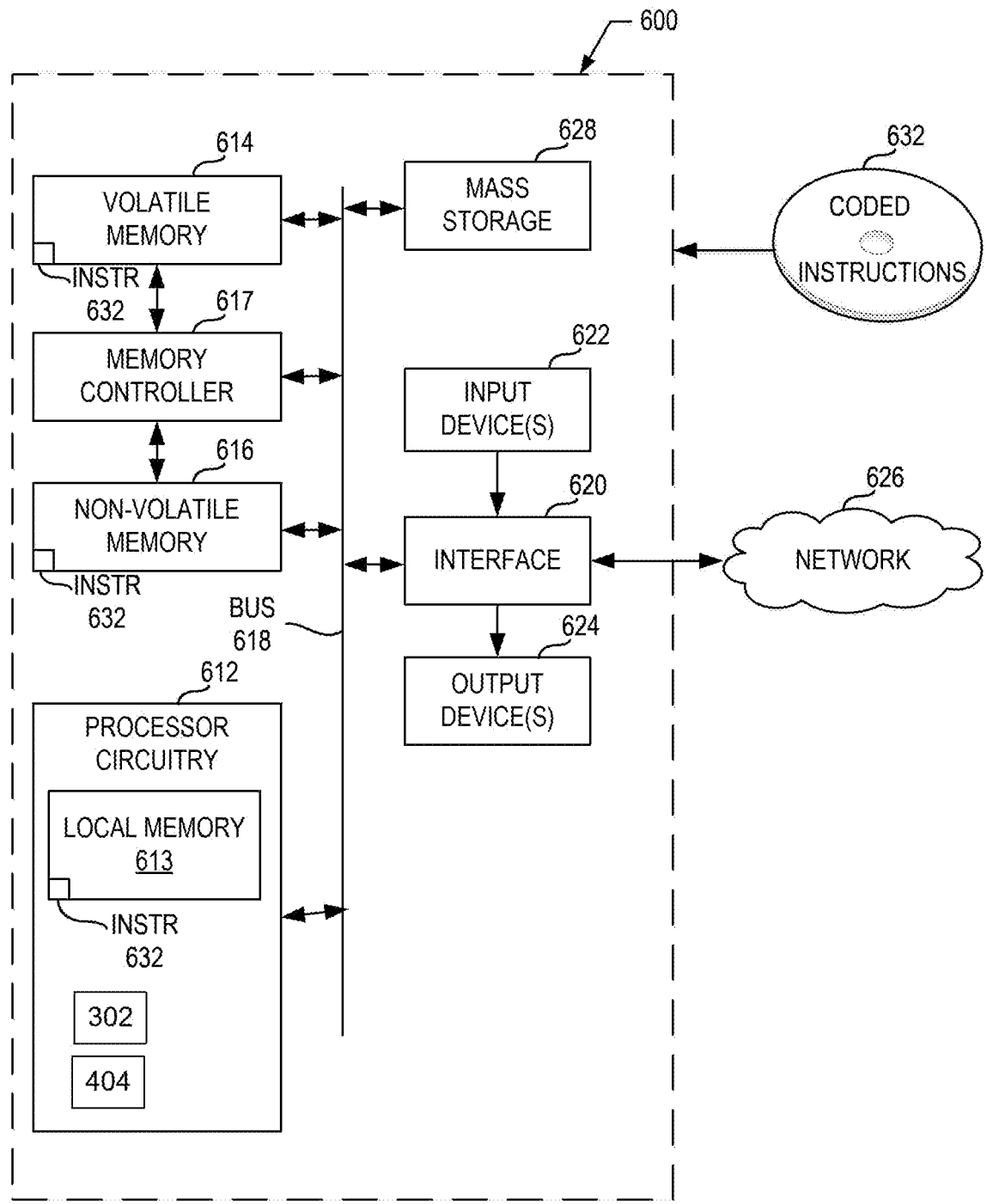
FIG. 6 is a block diagram of an example processing platform including programmable circuitry structured to execute, instantiate, and/or perform the example machine readable instructions and/or perform the example operations of FIG. 5 to implement the auxiliary combustor of FIG. 3.

FIG. 6 is a block diagram of an example programmable circuitry platform 600 structured to execute and/or instantiate the example machine-readable instructions and/or the example operations of FIG. 5 to implement the auxiliary combustor of FIG. 3. The programmable circuitry platform 600 can be, for example, an embedded engine control, a server, a personal computer, a workstation, a self-learning machine (e.g., a neural network), a mobile device (e.g., a cell phone, a smart phone, a tablet such as an iPad™), or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example auxiliary combustor 302.

The programmable circuitry 612 of the illustrated example includes a local memory 613 (e.g., a cache, registers, etc.). The programmable circuitry 612 of the illustrated example is in communication with main memory, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory, and more particularly the volatile memory 614 and non-volatile memory 616 of the illustrated example, is controlled by a memory controller 617. In some examples, the memory controller 617 may be implemented by one or more integrated circuits, logic circuits, microcontrollers from any desired family or manufacturer, or any other type of circuitry to manage the flow of data going to and from the volatile memory 614 and the non-volatile memory 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

Machine readable coded instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

From the foregoing, it will be appreciated that example systems, apparatus, articles of manufacture, and methods have been disclosed that incorporated auxiliary combustor. As described herein, when the engine is off, the auxiliary combustor provides a heat source to be used to heat liquid hydrogen to gaseous hydrogen state. For example, the auxiliary combustor produces heat from burning gaseous hydrogen available from the chill-down of liquid hydrogen in the hydrogen fuel system.

In a hydrogen fuel system, hydrogen is stored in liquid form and requires a starting heater and a vent heater to heat the liquid hydrogen to reach its gaseous hydrogen state during engine start operation. The starting heater and vent heater are electric heater which require an electric generator to power the heater. Furthermore, electric heater is typically heavy which adds to the weight of the overall system. The methods and apparatus disclosed herein incorporate an auxiliary combustor in the hydrogen fuel system to be used to heat liquid hydrogen to change phase to gaseous hydrogen state. The auxiliary combustor replaces the starting heater and vent heater resulting in a lighter overall system and does not require significant source of electricity.

Further aspects of the present disclosure are provided by the subject matter of the following clauses:

An example apparatus includes an auxiliary combustor configured to burn gaseous hydrogen to produce heat energy and a byproduct, a pipeline to transport gaseous hydrogen from a hydrogen supply to the auxiliary combustor, a vent coupled to the auxiliary combustor to vent excess gaseous hydrogen and the byproduct of combustion, and a heat exchanger coupled to the auxiliary combustor to use the heat energy of the auxiliary combustor to heat liquid hydrogen in the pipeline.

The apparatus of the preceding clause, wherein the vent is coupled to a first temperature sensor that measures a temperature set point of vented gaseous hydrogen and the byproduct of combustion.

The apparatus of any preceding clause, wherein the auxiliary combustor functions as a vent heater and a starting heater during an engine start operation.

The apparatus of any preceding clause, wherein the heat exchanger is coupled between the hydrogen supply and an engine combustor, the heat exchanger configured to heat the liquid hydrogen in the pipeline from the hydrogen supply to the engine combustor.

The apparatus of any preceding clause, further including a second temperature sensor to measure target temperature of incoming hydrogen to the engine combustor.

The apparatus of any preceding clause, wherein the gaseous hydrogen is generated during chill-down phase of the hydrogen supply.

The apparatus of any preceding clause, further including a controller operatively coupled to the auxiliary combustor, the controller to control ingress of heat energy and ingress of hydrogen to the engine combustor.

The apparatus of any preceding clause, wherein the gaseous hydrogen is transported through a pipeline from a hydrogen supply to the auxiliary combustor during chill-down of the hydrogen supply.

The apparatus of any preceding clause, wherein the byproduct of combustion includes water.

An example method includes supplying gaseous hydrogen from chill-down of a liquid hydrogen pipeline, burning the gaseous hydrogen in a heat source to produce heat energy and a byproduct, venting excess gaseous hydrogen and the byproduct of combustion, and heating liquid hydrogen in the pipeline using the heat energy from the heat source.

The method of the preceding clause, further including measuring a temperature set point of vented gaseous hydrogen and the byproduct of combustion.

The method of any preceding clause, wherein the liquid hydrogen is heated to supply hydrogen to an engine combustor for an engine start operation.

The method of any preceding clause, further including measuring a target temperature of incoming hydrogen to the engine combustor.

The method of any preceding clause, further including controlling an egress of heat energy and ingress of hydrogen to the engine combustor.

An example apparatus includes a controller to control ingress of thermal load and hydrogen to an engine combustor, a heat source coupled to a heat exchanger to supply the thermal load, and a liquid hydrogen supply coupled to the heat exchanger to supply hydrogen through a pipeline to the engine combustor.

The apparatus of the preceding clause, further including a first sensor coupled between the heat exchanger and a vent.

The apparatus of any preceding clause, wherein the vent is configured to vent excess gaseous hydrogen and byproduct of the heat source.

The apparatus of any preceding clause, further including a second sensor coupled between the heat exchanger and the engine combustor.

The apparatus of any preceding clause, wherein the thermal load includes heat energy used in the engine combustor start operation.

The apparatus of any preceding clause, wherein the auxiliary combustor burns gaseous hydrogen generated during chill-down of liquid hydrogen.

The apparatus of any preceding clause, wherein the heat source includes at least one of an auxiliary combustor, a second engine, a heat pump, an auxiliary power unit, a fuel cell or an electric heater The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
a heat source configured to burn gaseous hydrogen to produce heat energy and a byproduct of combustion;
a pipeline to transport, at a first time, a first portion of liquid hydrogen from a hydrogen supply to the heat source to absorb heat from the heat source and convert the first portion of liquid hydrogen to the gaseous hydrogen;
a vent coupled to the heat source to vent excess gaseous hydrogen not burned by the heat source and the byproduct of combustion; and
a heat exchanger coupled to the heat source to use the heat energy of the heat source to heat a second portion of liquid hydrogen in the pipeline at a second time.

2. The apparatus of claim 1, wherein the vent is coupled to a first temperature sensor that measures a temperature set point of at least one of the vented excess gaseous hydrogen or the vented byproduct of combustion.

3. The apparatus of claim 1, wherein the heat source functions as a vent heater and a starting heater during an engine start operation.

4. The apparatus of claim 1, wherein the heat exchanger is coupled between the hydrogen supply and an engine combustor, the heat exchanger configured to heat the second portion of the liquid hydrogen in the pipeline from the hydrogen supply to the engine combustor.

5. The apparatus of claim 4, further including a second temperature sensor to measure a target temperature of incoming gaseous hydrogen to the engine combustor.

6. The apparatus of claim 4, further including a controller operatively coupled to the heat source, the controller to control egress of the heat energy and ingress of the gaseous hydrogen to the engine combustor.

7. The apparatus of claim 1, wherein the gaseous hydrogen is generated during chill-down phase of a hydrogen flow path.

8. The apparatus of claim 1, wherein the gaseous hydrogen is transported through the pipeline from the hydrogen supply to the heat source during chill-down of the hydrogen supply.

9. The apparatus of claim 1, wherein the heat source includes at least one of an auxiliary combustor, a second engine, a heat pump, an auxiliary power unit, a fuel cell or an electric heater.

10. A method comprising:
supplying, at a first time, gaseous hydrogen from chill-down of a liquid hydrogen pipeline to cool a heat source;
burning, at a second time, the gaseous hydrogen in the heat source to produce heat energy and a byproduct of combustion;
venting excess gaseous hydrogen that was not burned in the heat source and the byproduct of combustion from the heat source; and
heating, at a third time, liquid hydrogen in the liquid hydrogen pipeline using the heat energy from the heat source.

11. The method of claim 10, wherein the liquid hydrogen is heated to supply hydrogen to an engine combustor for an engine start operation.

12. The method of claim 11, further including measuring a target temperature of incoming hydrogen to the engine combustor.

13. The method of claim 11, further including controlling an egress of heat energy and ingress of hydrogen to the engine combustor.

14. An apparatus comprising:
a controller to control ingress of a thermal load and hydrogen to an engine combustor;
a heat source coupled to a heat exchanger to supply the thermal load for chill-down and engine start;
a liquid hydrogen supply coupled to the heat exchanger to supply hydrogen through a pipeline to the engine combustor; and
a vent configured to vent excess gaseous hydrogen and byproduct of the heat source after the gaseous hydrogen has been used for chill-down and engine start.

15. The apparatus of claim 14, further including a first sensor coupled between the heat exchanger and the vent.

16. The apparatus of claim 14, further including a second sensor coupled between the heat exchanger and the engine combustor.

17. The apparatus of claim 14, wherein the thermal load includes heat energy used in the engine combustor start operation.

18. The apparatus of claim 14, wherein the heat source burns the gaseous hydrogen generated during chill-down of liquid hydrogen.

19. The apparatus of claim 14, wherein the heat source includes at least one of an auxiliary combustor, a second engine, a heat pump, an auxiliary power unit, a fuel cell or an electric heater.

* * * * *